United States Patent [19]
Beck

[11] Patent Number: 4,635,945
[45] Date of Patent: Jan. 13, 1987

[54] ANTI-EXTRUSION SEAL WITH PRIMARY AND SECONDARY COMPLEMENTARY ELEMENTS

[75] Inventor: Gerald H. Beck, Sandy, Utah

[73] Assignee: Microdot Inc., Darien, Conn.

[21] Appl. No.: 842,182

[22] Filed: Mar. 21, 1986

[51] Int. Cl.$^4$ .............................................. F16J 15/22
[52] U.S. Cl. .................................. 277/124; 277/125; 277/165; 277/188 A
[58] Field of Search ............................... 277/123–125, 277/188 R, 188 A, 165, 192, 193

[56] References Cited

U.S. PATENT DOCUMENTS

| | | | |
|---|---|---|---|
| 2,665,151 | 1/1954 | Fisler et al. | 277/124 |
| 2,934,363 | 4/1960 | Knox | 277/188 A X |
| 3,554,563 | 1/1971 | Schumacher | 277/124 |
| 3,833,228 | 9/1974 | Gilliam | 277/124 X |
| 4,090,719 | 5/1978 | Simanskis et al. | 277/125 |
| 4,288,082 | 9/1981 | Setterberg | 277/125 |

Primary Examiner—Robert S. Ward
Attorney, Agent, or Firm—Lyman R. Lyon

[57] ABSTRACT

A composite seal comprising a primary seal element and a secondary sealing element. The primary seal element is more readily deformable than the secondary seal element. Juxtaposed surfaces of the seal elements are configured to minimize extrusion of the primary seal element past the secondary seal element.

2 Claims, 3 Drawing Figures

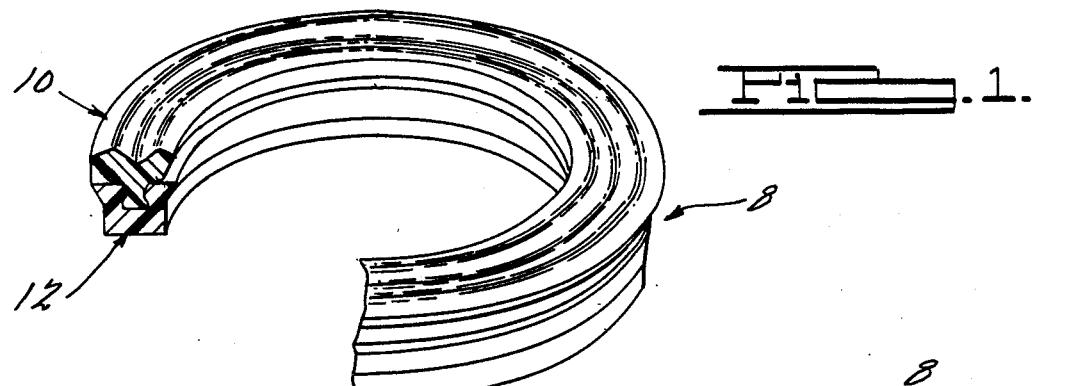
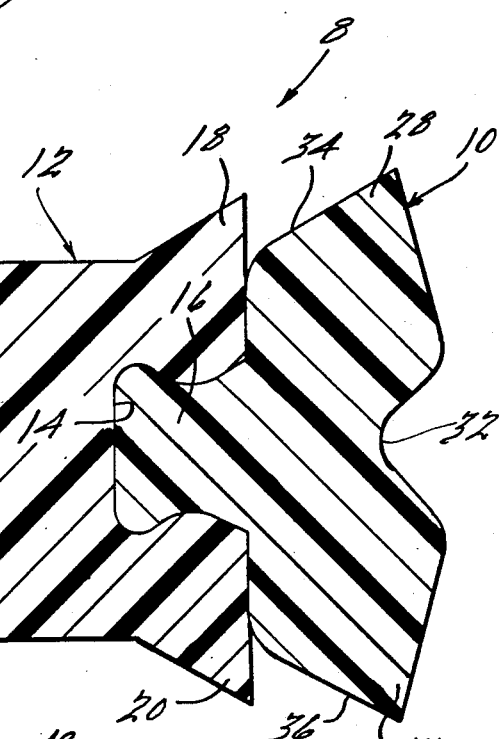
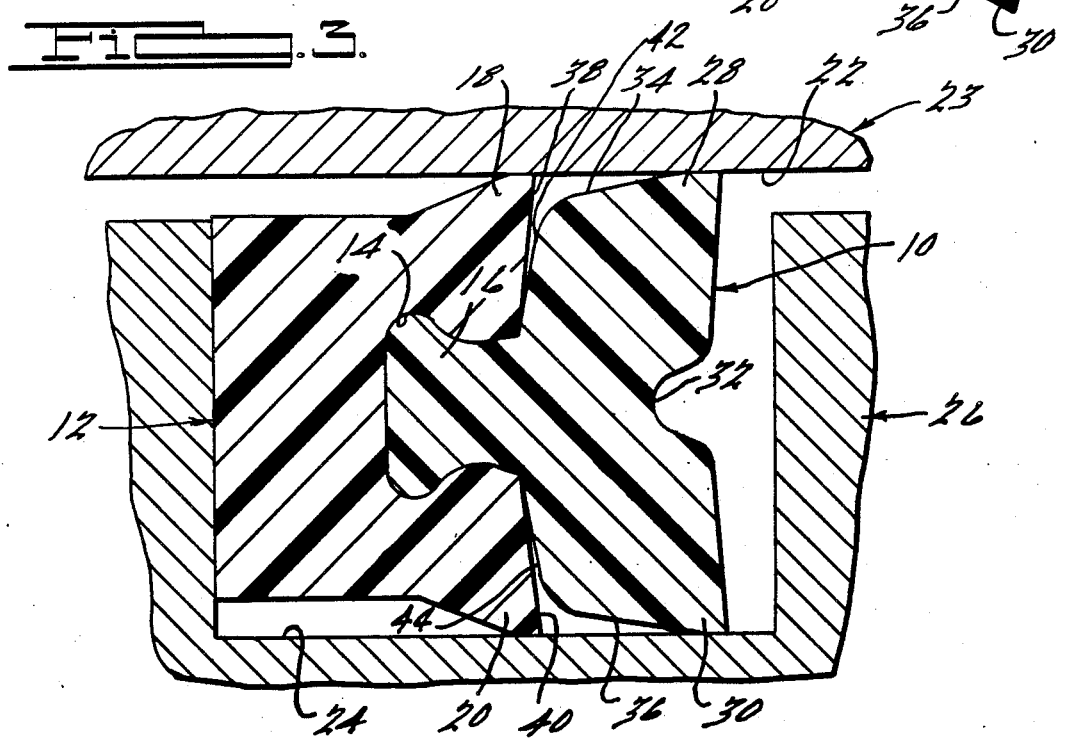

4,635,945

ANTI-EXTRUSION SEAL WITH PRIMARY AND SECONDARY COMPLEMENTARY ELEMENTS

BACKGROUND OF THE INVENTION

Hydraulic cylinders of the type disclosed in U.S. Pat. No. 3,848,880 generally utilize a seal assembly on the piston thereof to prevent leakage of fluid past the piston. As taught in said patent, a unitary composite seal assembly for such cylinders comprises a relatively hard synthetic rubber U-cup and a relatively softer synthetic rubber sealing ring that fills a central recess in the U-cup. The sealing ring may be mechanically retained or bonded within the U-cup.

SUMMARY OF THE INVENTION

The present invention provides an improved composite seal assembly suitable for sealing high pressure systems in low temperature conditions.

The composite seal comprises an annular primary sealing element and an annular secondary sealing element. The primary sealing element is made of a relatively deformable material and is mechanically retained in a complimentary undercut in the secondary element.

The secondary sealing element is made of a relatively rigid material such as hard thermoplastic and has opposed conical surfaces that function as antiextrusion supports for the primary sealing element. In addition, the secondary sealing element contains secondary sealing lips which act as redundant seals upon installation and which are energized further through displacement of the primary sealing element.

An advantage over similar seal arrangements is offered in that pressure is not required to energize the secondary sealing element as an active seal resulting in superior initial sealing and film breaking action in low pressure applications where high fluid viscosity and low temperatures are encountered. The secondary seal is further energized as pressure increases thereby to act as a redundant seal to the primary sealing element throughout the entire pressure range of the system. The configuration of the interface between the primary and secondary seal elements precludes extrusion of the relatively soft primary element between the secondary element and the cylinder wall.

BRIEF DESCRIPTION OF THE DRAWINGS

FIG. 1 is a perspective view, partly in cross section, of the composite seal of the present invention;

FIG. 2 is a cross-sectional view of the composite seal in its free or uninstalled condition; and FIG. 3 is a cross-sectional view of the composite seal in the installed condition between a piston and cylinder.

DETAILED DESCRIPTION OF THE PREFERRED EMBODIMENT OF THE INVENTION

In accordance with a preferred embodiment of the instant invention, a composite seal 8 comprises a primary sealing element 10 that is engaged with a U-shaped secondary sealing element 12. The primary element 10 is made of relatively soft and deformable elastic material such as synthetic rubber or other synthetic elastomers, either thermoset or thermoplastic. The primary element 10 preferably has a durometer of between 60 and 90 on the Shore A Scale.

The secondary sealing element 12 is of generally U-shaped cross section and is made from a relatively rigid yet deformable or yieldable material, including flexible or relatively rigid elastomers, relatively hard rubber; or thermoset or thermoplastic plastics, such as polyurethane and polyamids having a durometer of between 95 and 125 on the Shore A Scale. In all cases the material of the element 12 is harder and less readily deformable than the material of the primary element 10.

As best seen in FIGS. 2 and 3, the secondary element 12 has an annular T-shaped recess 14 therein for the acceptance of a depending generally T-shaped annulus 16 on the primary element 10 to mechanically lock the elements 10 and 12 together.

In accordance with one feature of the instant invention, the secondary element 12 has a pair of oppositely directed legs 18 and 20 that are engaged at all times with a wall 22 of a cylinder 23 and wall 24 of a piston 26, respectively. Similarly, the primary element 10 has a pair of annular lips 28 and 30 that are engageable with the wall 22 of the cylinder 23 and wall 24 of piston 26, respectively. The element 10 has a groove 32 between the lips 28 and 30 to augment lateral deflection thereof when the seal 8 is subjected to pressurized fluid.

In accordance with another feature of the instant invention, the element 10 is provided with convergant inclined surfaces 34 and 36 extending axially and radially from the lips 28 and 30, respectively, to preclude extrusion of the lips 28 and 30 past the legs 18 and 20 of the element 12. This anti-extrusion feature is complemented by the inclined end faces 38 and 40 on the legs 18 and 20 of the element 12 which support complementary inclined surfaces 42 and 44, respectively, on the element 10 thereby to further preclude extrusion of the element 10 past the lips 18 and 20 on the element 12.

In the installed condition shown in FIG. 3, the central recess 32 between the lips 28 and 30 of the element 10 is deformed from the initial condition shown in FIG. 2 to facilitate deflection of the lips 28 and 30 thereby to maintain a bias on the cylinder wall 22 and piston wall 24 even though there is no significant fluid pressure within cylinder 22. Stated in another manner, the lips 18 and 20 of the element 12 and the lips 28 and 30 of the element 10 are all deformed upon installation so as to maintain initial sealing contact with surface 22 of the cylinder 23 and surface 24 of the piston 26.

While the preferred embodiment of the invention has been disclosed, it should be appreciated that the invention is susceptible of modification without departing from the scope of the following claims.

I claim:

1. A composite seal for disposition about a circular element having a central axis, said seal comprising
an annular primary sealing element having a durometer of 60 to 90 on the Shore A Scale,
an annular secondary sealing element having a durometer of 95 to 125 on the Shore A Scale,
said secondary element being of a generally U-shaped radial cross section defined by radially spaced axially extending legs connected by a radially extending bight portion,
the legs of said secondary seal element being normally engageable with said circular element and with the wall of a supporting element, respectively,
the legs on said secondary element having conical axial end faces, respectively, inclined axially and radially toward the bight portion thereof,
said primary element having a pair of radially spaced lips with axially and radially inclined surfaces complementary to and in juxtaposed relation to the end faces on said secondary element to preclude extrusion of said primary element past the legs of said secondary element.

2. A seal in accordance with claim 1 wherein the lips on said primary seal element are axially inclined toward the bight portion of said secondary seal element whereby the interface between the inclined surfaces on said primary seal element and the conical end faces on said secondary seal element is less than the radial dimension of the conical end faces.

* * * * *